US010241761B2

(12) United States Patent
Marathe et al.

(10) Patent No.: US 10,241,761 B2
(45) Date of Patent: Mar. 26, 2019

(54) SYSTEM AND METHOD FOR COMPILER SUPPORT FOR COMPILE TIME CUSTOMIZATION OF CODE

(71) Applicant: Nvidia Corporation, Santa Clara, CA (US)

(72) Inventors: Jaydeep Marathe, San Jose, CA (US); Vinod Grover, Mercer Island, WA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/968,740

(22) Filed: Dec. 14, 2015

(65) Prior Publication Data
US 2016/0188352 A1  Jun. 30, 2016

Related U.S. Application Data

(60) Provisional application No. 62/097,528, filed on Dec. 29, 2014.

(51) Int. Cl.
*G06F 8/41* (2018.01)
*G06F 8/51* (2018.01)

(52) U.S. Cl.
CPC . *G06F 8/41* (2013.01); *G06F 8/51* (2013.01)

(58) Field of Classification Search
CPC .................................... G06F 8/41; G06F 8/51
USPC ....................................................... 717/145
See application file for complete search history.

(56) References Cited

U.S. PATENT DOCUMENTS

| 7,711,546 B2* | 5/2010 | Mola Marti | G06F 17/241 704/5 |
| 2002/0143929 A1* | 10/2002 | Maltz | H04L 41/0213 709/224 |
| 2003/0071844 A1* | 4/2003 | Evans | G06F 8/34 715/763 |
| 2006/0036745 A1* | 2/2006 | Stienhans | G06F 8/38 709/228 |
| 2007/0204210 A1* | 8/2007 | Gormish | H04N 1/00214 715/203 |
| 2008/0162207 A1* | 7/2008 | Gross | G06F 8/35 703/2 |
| 2008/0313282 A1* | 12/2008 | Warila | G06F 8/24 709/206 |

(Continued)

FOREIGN PATENT DOCUMENTS

| CN | 101233487 | 7/2008 |
| CN | 101963918 | 2/2011 |

(Continued)

*Primary Examiner* — Chameli Das
(74) *Attorney, Agent, or Firm* — Hogan Lovells US LLP

(57) ABSTRACT

A system and method for processing source code for compilation. The method includes accessing a portion of host source code and determining whether the portion of the host source code comprises a device lambda expression. The method further includes in response to the portion of host code comprising the device lambda expression, determining a unique placeholder type instantiation based on the device lambda expression and modifying the device lambda expression based on the unique placeholder type instantiation to produce modified host source code. The method further includes sending the modified host source code to a host compiler.

18 Claims, 5 Drawing Sheets

(56) References Cited

U.S. PATENT DOCUMENTS

| | | | | |
|---|---|---|---|---|
| 2010/0235730 A1* | 9/2010 | Campbell | | G06F 17/24 715/256 |
| 2010/0295852 A1* | 11/2010 | Yang | | G06F 1/3203 345/426 |
| 2011/0314458 A1* | 12/2011 | Zhu | | G06F 8/314 717/149 |
| 2012/0038940 A1* | 2/2012 | Boskovic | | G06F 3/1206 358/1.13 |
| 2012/0159464 A1* | 6/2012 | Demetriou | | G06F 8/45 717/148 |
| 2012/0265750 A1* | 10/2012 | Moon | | G06F 17/30241 707/715 |
| 2013/0014094 A1* | 1/2013 | Chkodrov | | G06F 17/30463 717/143 |
| 2013/0036409 A1* | 2/2013 | Auerbach | | G06F 8/456 717/140 |
| 2013/0106879 A1* | 5/2013 | Williams | | G06T 1/00 345/522 |
| 2013/0227521 A1* | 8/2013 | Bourd | | G06F 11/3604 717/110 |
| 2013/0311986 A1* | 11/2013 | Arrouye | | G06F 8/61 717/175 |
| 2014/0068557 A1* | 3/2014 | Vanags | | G06F 8/437 717/116 |
| 2014/0317636 A1* | 10/2014 | Mattheis | | G06F 9/46 718/106 |
| 2015/0143347 A1* | 5/2015 | Jones | | G06F 8/30 717/140 |
| 2015/0347108 A1* | 12/2015 | Munshi | | G06F 8/41 717/146 |
| 2016/0011857 A1* | 1/2016 | Grover | | G06F 9/4552 717/148 |

FOREIGN PATENT DOCUMENTS

| | | |
|---|---|---|
| CN | 102541618 | 7/2012 |
| CN | 103124956 | 5/2013 |
| CN | 103389908 | 11/2013 |
| CN | 103858099 | 6/2014 |
| CN | 104035781 | 9/2014 |

* cited by examiner

SYSTEM AND METHOD FOR COMPILER SUPPORT FOR COMPILE TIME CUSTOMIZATION OF CODE

RELATED U.S. APPLICATIONS

This application claims the benefit of and priority to the provisional patent application Ser. No. 62/097,528, entitled "COMPILER TRANSFORMATIONS AND MECHANISMS TO SUPPORT COMPILE TIME CUSTOMIZATION OF CODE EXECUTING ON THE GPU WITH LAMBDA EXPRESSIONS DEFINED IN CODE MARKED FOR CPU EXECUTION," with filing date Dec. 29, 2014, and hereby incorporated by reference in its entirety.

This application is related to non-provisional patent application Ser. No. 13/735,981, entitled "SYSTEM AND METHOD FOR COMPILER SUPPORT FOR KERNEL LAUNCHES IN DEVICE CODE," with filing date Jan. 7, 2013, which claims priority to provisional patent application Ser. No. 61/645,515, entitled "SYSTEM AND METHOD FOR COMPILER SUPPORT FOR KERNEL LAUNCHES IN DEVICE CODE," with filing date May 10, 2012, each of which are hereby incorporated by reference in its entirety.

FIELD

Embodiments of the present invention are generally related to compilation of host source code and device source code, and graphics processing units (GPUs).

BACKGROUND

As computer systems have advanced, graphics processing units (GPUs) have become increasingly advanced both in complexity and computing power. GPUs are thus used to handle processing of increasingly large and complex graphics. As a result of this increase in processing power, GPUs are now capable of executing both graphics processing and more general computing tasks. The ability to execute general computing tasks on a GPU has lead to increased development of programs that execute general computing tasks on a GPU and the corresponding need to be able to perform an increasing number of the complex programming tasks.

A general-purpose computing on graphics processing units (GPGPU) program has a host portion executing on a central processing unit (CPU) and a device portion executing on a GPU. A GPGPU compiler compiles the GPU or device code and provides the host code to the local compiler for the host machine. The local compiler for the host machine can thus vary depending on the programming environment where the GPGPU compiler is being executed. As result, the code sent to the host compiler needs to be compliable by any of a variety of different host compilers. This can create issues when new features and/or advanced features are added to a programming language.

SUMMARY OF THE INVENTION

Accordingly, what is needed is a solution to allow support of programming language features while allowing the use of any of a variety of host compilers to compile host code of a GPGPU or heterogeneous program.

Embodiments allow for compilation of the lambda expressions in host code without modification or customization of a host compiler. Embodiments can identify lambda expressions associated with a respective device code entry point (e.g., _global_ template instantiation in CUDA C++) and replace each lambda with a unique placeholder type instantiation thereby allowing compilation by a host compiler of lambda expressions that are defined in host code without host compiler modification.

A 'device code entry function' represents the code location where device code starts execution. A device code entry function can be generated from a device code entry function template, when the template is instantiated with template arguments as allowed by the language dialect. Each distinct template instantiation is a distinct device code entry function.

A 'device lambda expression' is a lambda expression defined in host code, where the lambda expression contains device code, e.g., code that executes on a GPU.

In one embodiment, the present invention is directed to a method for processing source code for compilation. The method includes accessing a portion of host source code and determining whether the portion of the host source code comprises a device lambda expression. The device lambda expression is associated with a device code entry point (e.g., _global_ template instantiation in CUDA C++). The method further includes in response to the portion of host code comprising the device lambda expression, determining a unique placeholder type instantiation based on the device lambda expression and modifying the device lambda expression based on the unique placeholder type instantiation to produce modified host source code. In some embodiments, the unique placeholder type instantiation comprises a type associated with a function enclosing the device lambda expression. In some embodiments, the unique placeholder type instantiation comprises an address of the function enclosing the device lambda expression. In some embodiments, the unique placeholder type instantiation comprises a unique identifier associated with the device lambda expression. In some embodiments, the unique placeholder type instantiation comprises one or more variables associated with the device lambda expression. In some embodiments, the unique placeholder type instantiation captures the one or more variables associated with the device lambda expression by explicitly passing the values of the one or more variables to a constructor of the placeholder type instantiation. The method further includes sending the modified host source code to a host compiler.

The method can further include determining a device code entry function template specialization based on the unique placeholder type instantiation associated with the device lambda expression, where the original host source code comprises a device code entry function template and a device lambda expression whose type is being used in the instantiation of this template.

In one embodiment, the present invention is directed toward a system for compiling code. The system includes a code access module operable to access source code from a data store, where the source code comprises host source code and device source code and a device lambda expression identification module configured to identify a device lambda expression in a portion of the host source code. The system further includes a placeholder type determination module configured to determine a placeholder type instantiation based on the device lambda expression and a code modification module configured to modify the host source code to replace the device lambda expression with the placeholder type instantiation. In some embodiments, the placeholder type instantiation comprises a type associated with a function enclosing the device lambda expression. In some embodiments, the placeholder type instantiation comprises an address of the function enclosing the device lambda expression. In some embodiments, the placeholder type instantiation comprises a unique identifier associated with the device lambda expression. In some embodiments, the placeholder type instantiation comprises one or more variables associated with the device lambda expression. In some embodiments, the placeholder type instantiation captures the one or more variables associated with the device lambda expression by explicitly passing the values of the one or more variables to a constructor of the placeholder type instantiation. In some embodiments, the code modification module is further configured to modify the host code based on the device code entry function template specialization determined by the template specialization determination module.

The system can further include a template specialization determination module configured to determine a device code entry function template specialization based on the device lambda expression. The system can further include a code sending module configured to send the host source code as modified by the code modification module to a host compiler.

In another embodiment, the present invention is implemented as a method for modifying code for compilation. The method includes accessing a portion of host source code and determining whether the portion of the host source code comprises a device lambda expression associated with a device code entry function template instantiation. The method further includes determining a unique placeholder type instantiation based on the device lambda expression and determining a device code entry function template specialization based on the unique placeholder type instantiation. The host source code (e.g., original or accessed host source code) comprises a device code entry function template and a device lambda expression whose type is used in an instantiation of the template. The method further includes generating modified host source code by replacing the device lambda expression with an instance of the unique placeholder type instantiation and generating a device code entry function specialization (e.g., a new device code entry function specialization) based on the unique placeholder type instantiation (e.g., that uses the unique placeholder type instantiation in its template arguments). The method further includes sending the modified host source code to a host compiler. In some embodiments, the unique placeholder type instantiation comprises a type associated with a function enclosing the device lambda expression. In some embodiments, the unique placeholder instantiation comprises an address of the function enclosing the device lambda expression and a unique integer identified associated with the device lambda expression.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
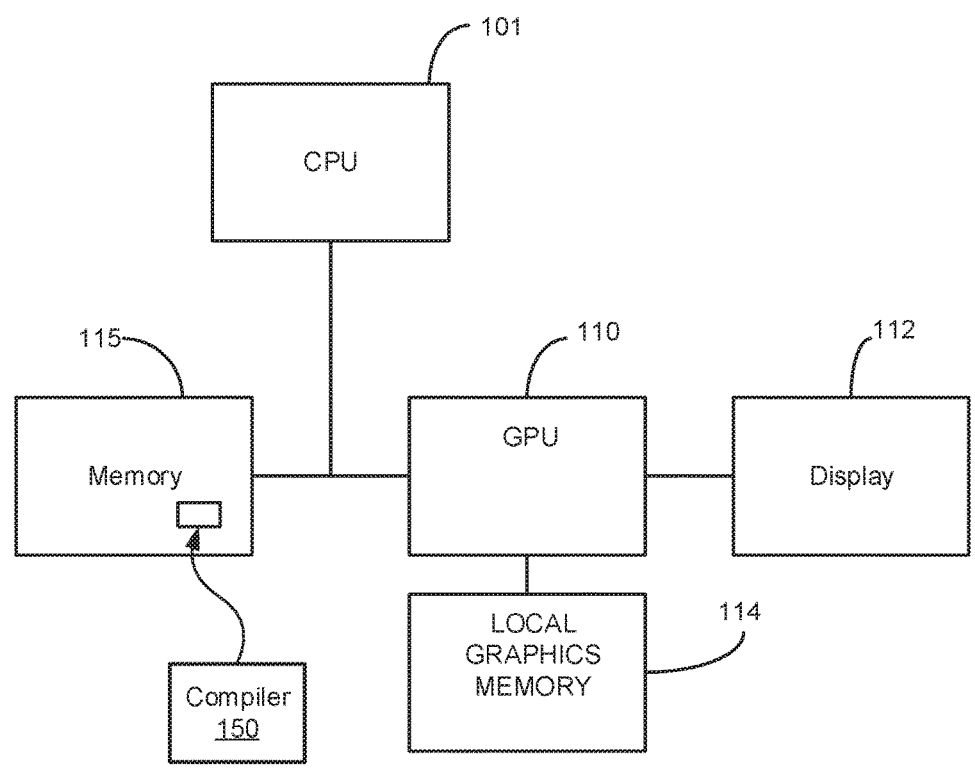
FIG. 1 shows an exemplary computer system in accordance with various embodiments.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

In one exemplary embodiment, GPU 110 is operable for general-purpose computing on graphics processing units (GPGPU) computing. General-purpose computing on graphics processing units (GPGPU) programs or applications may be designed or written with the Compute Unified Device Architecture (CUDA) framework and Open Computing Language (OpenCL) framework. GPU 110 may execute Compute Unified Device Architecture (CUDA) programs and Open Computing Language (OpenCL) programs.

It is appreciated that the parallel architecture of GPU 110 may have significant performance advantages over CPU 101.

In some embodiments, the memory 115 includes a compiler 150 for compiling heterogeneous code (e.g., GPGPU code) or code including host code and device code. The compiler 150 can be a device code compiler with support for modifying host code to allow compilation of host source by any of a variety of host compilers. The compiler 150 may modify host source code including a device lambda expression associated with a device code entry function template instantiation, as described herein. The compiler 150 may send the modified host code to a host compiler (not shown).

Lambda Expressions in GPGPU Programming Environments and Compilation

A GPGPU language may support a subset of a programming specification. For example, the CUDA language may support a subset of the C++ specification. The C++ standard introduces "lambda expressions" which allow executable functions to be defined "inline" at the point of use. A lambda expression has an associated closure type that is not explicitly named. This closure type can be used for or participate in template instantiation.

An exemplary portion of code with a lambda expression:

TABLE I

Exemplary code portion with a lambda expression

```
int main(void)
{
    auto lambda = [=] {return 10;};   //lambda expression
    return lambda( ) ; // call operator( ) of the compiler generated closure class defined for the lambda
}
```

A lambda expression may look like a function but is more than a function. A lambda expression is a portion or snippet of code that can be defined anywhere. For example, a lambda expression can be defined in a function or outside of a function.

A lambda expression in C++ is actually an object called a "functor." A functor is a class object, e.g., a standard C++ class type, that implements the parenthesis operator or operator( ). The operator( ) is a function of an instance of a class that can be called. For example, if there is class 'T' and an object of the class T declared named 'a', then because the class has an operator( ), 'a( )' looks like a function call to a function called 'a' but actually invokes the parenthesis operator of the object 'a'. A lambda expression is an instance of a functor. A lambda expression is a type of functor with special characteristics with compiler support in C++.

A lambda expression is an instance of a functor but the name of the type is not known to the user. Referring to Table I, the [=] or square bracket starts the lambda expression. The code after the [=] until the end of the declaration (e.g., closing and ;) is the lambda expression. The lambda expression denotes an instance of a functor but the name of the class is not defined. In other words, the lambda expression is part of an unnamed class. The name of the class is known only to the compiler that is processing the lambda expression. In other words, the lambda expression is an unnamed functor.

Lambda expressions allow the defining of functionality at the point in code where it will be used. The lambda expression thus allows defining functionality for customizing a function or class at the point of use. Lambdas can further be useful for customizing functionality with user defined code at compile time. For example, the standard library sort function std::sort can be customized at compile time with a lambda expression implementing a user defined comparison function. As another example, quicksort functionality can be instantiated and a lambda expression is passed as a compiled function. The lambda expression allows avoiding having to define a separate class and naming the class which would be cumbersome in comparison to the use of a lambda expression.

As a lambda expression is an instance of a class, a template can be instantiated based on the lambda expression. For example, a function template such as 'template <typename T> void foo(void)' can be instantiated with the lambda's associated type (associated type is called the 'closure type'). The compiler will know the name of the closure type but there is no name for the closure type in the code. A lambda expression can also be used to instantiate class templates.

Lambda expressions can further capture local variables that are used in the lambda expression. This means that the value of a variable is captured at the point of definition of the lambda expression. In order words, copies of variables are made of the variables within the lambda expression. Variables may also be modified by reference (e.g., &) within the lambda expression.

A 'device lambda expression' is a lambda expression defined in host code, where the lambda expression contains device code, e.g., code that executes on the GPU.

In one exemplary embodiment, with a CUDA program, there are host functions which execute on the CPU and device functions that execute on the GPU. There are more special functions called global entry functions (e.g., _global_functions) which are entry points for device code. In CUDA C++, the GPU entry functions can be templates. These templates are instantiated and launched from host code. Users may wish to customize _global_ function template instantiations with device lambda expressions defined in host code. However, this is not allowed by some GPGPU models because the type of the lambda expression is not explicitly known. Embodiments allow GPGPU (e.g., CUDA) implementations to remove this restriction, making GPGPU (e.g., CUDA or OpenCL) languages more useable and closer to C++.

GPGPU programming systems may use the local host compiler for compilation of host code (e.g., code to execute on a CPU). For example, a CUDA compiler toolchain, may not ship with a host compiler. Instead a compiler frontend may be shipped that partitions the incoming heterogeneous source CUDA file into host (e.g., CPU) and device (e.g., GPU) code. The device code is processed by the CUDA backend compiler that generates executable GPU machine code. The host code is regenerated as high level C++ (e.g., including templates) and is passed or sent to the host compiler present on the platform (e.g., g++, cl.exe, clang++).

The _global_functions represent device code entry points and the _global_function templates can be instantiated from host code and launched on the device. In order to support _global_function templates, given the toolchain constraints of using a local host compiler and the need to generate high level host side C++ code, the CUDA compiler frontend generates explicit _global_function template specializations in the code which are passed to the host compiler. For example, consider the following input CUDA source file:

TABLE II

Exemplary input CUDA source file

```
_device_ int result;
template <typename T>
_global_ void foo(T in) { result = in;}
int main(void)
{
foo<int><<<1,1>>>(1);
foo<char><<<1,1>>>(2);
}
```

In the code sent to the host compiler, the CUDA frontend synthesizes explicit specializations of 'foo<int>' and 'foo<char>.' The specializations implement the tasks necessary for the kernel launch, e.g., copying the parameter values and invoking the CUDA runtime to launch the kernel.

When the CUDA compiler frontend generates explicit specializations for _global_function templates, the compiler frontend needs to explicitly name the type and non-type arguments participating in the instantiation (e.g., 'char' and 'int' in the example of Table II). This presents a problem when the template argument involves the closure type associated with a lambda expression. The closure type is not explicitly named. The name is only known to the compiler and the name is not standardized across compiler implementations. Furthermore, the _global_function template specializations are defined in namespace scope, but if the lambda expression is defined within a function, the closure type is local to the enclosing function scope and as a result is not accessible from outside the function. Accessing the type outside of a function would be required in the case where the type is needed to define an explicit template specialization, since explicit specializations need to be defined in namespace scope.

Exemplary Systems and Methods for Compiler Support for Compile Time Customization of Code A 'device code entry function' represents the code location where device code starts execution. A device code entry function can be generated from a device code entry function template, when the template is instantiated with template arguments as allowed by the language dialect. Each distinct template instantiation is a distinct device code entry function.

A 'device lambda expression' is a lambda expression defined in host code, where the lambda expression contains device code, e.g., code that executes on a GPU.

Embodiments allow for compilation of the device lambda expressions in host code without modification or customization of a host compiler. Embodiments can identify device lambda expressions associated with a respective device code entry function template instantiation and replace each device lambda expression with an instance of a unique placeholder type instantiation thereby allowing compilation by a host compiler of device lambda expressions that are defined in host code.

Embodiments identify and mark each device lambda expression defined in host code. When generating code (e.g., C++) to be sent to the host compiler, each of the identified lambda expressions are replaced with a definition of an instance of a new "placeholder" namespace scope type template instantiation.

Embodiments are configured to ensure a unique placeholder type instantiation is associated with each of the replaced lambda expressions. In some embodiments, support for the unique placeholder type instantiation is associated with a defining candidate lambda expression being within a function scope. For example, the uniqueness of the placeholder type is ensured by adding two template arguments to the placeholder type instantiation: 1) the address of the function enclosing the original lambda expression definition, and 2) a unique integer constant that is assigned to differentiate the candidate lambda expression from other candidate lambda expressions defined in the same function. The unique integer constant can be implemented by maintaining a counter on a per function basis that is incremented each time a candidate lambda expression is processed.

In cases where the lambda expression captures any variables from the enclosing function, the placeholder type is instantiated with the types of the captured variables and the placeholder type's constructor saves the values of the captured variables.

When generating the explicit _global_ function template instantiations where the template argument involves a lambda expression closure type, the compiler frontend (e.g., CUDA compiler frontend) uses the instantiation of the placeholder type instead of the closure type (e.g., the lambda expression closure type).

TABLE III

Exemplary input CUDA source code with a lambda expression type involved in an instantiation of a _global_ function template

```
_device_ int result;
template <typename T>
_global_ void foo(T in) { result = in(4);}
int main(void)
{
int x=10;
double d =20;
auto lam1 = [=] _device_ (int in) {return x + d * in; };
foo<<<1,1>>(lam1);
}
```

The source code of Table III includes host code with the standard main function and device code associated with a device code entry function template that has a customized template instantiation of the _global_ function template. The template instantiation is associated with a device lambda expression that is defined in host code. The use of lambda expressions creates the situation where a generic template is passed in a specialization of code defined right at a point of definition within the function in host code. It is appreciated that without lambda expression support, a class would need to be written external to the function body with the operator( ). For example, a class bar would be created and the template foo would be instantiated with an instance of bar.

Table III includes 'lam1' which defined a device lambda expression. The closure type associated with the lambda expression is used to instantiate the _global_ function template 'foo' (e.g., foo<<<1,1>>(lam1);). In other words, the global template is instantiated with the closure type associated with the device lambda expression. The device lambda expression captures the variables 'd' and 'x' from the enclosing function (e.g., main). The variables 'x' and 'd' are used in device code even though the variables are host variables, so the compiler copies the variables and ensures the variables are copied to the _global_ function and executed on the device. Thus, the compiler captures the host variables by copying the host variable for use in the _global_ function to be executed on the device.

The lambda expression will be executed based on the template of Table III (e.g., template <typename T> _global_ void foo(T in) {result=in(4);}) and the instance of the operator( ) will be passed the value of four.

It is appreciated that the code of Table III is exemplary and embodiments can support other variations. For example, the same lambda of Table III could be used to instantiate a class template, making the lambda expression a field of some structure which is then passed to the foo function template. Embodiments allow the use of any functionality of a template with a device lambda expression including, but not limited to, multiple levels of nesting. It is noted that while certain aspects are discussed with reference to lambda expressions, embodiments are capable operating with and/or processing any entity that participates in a template instantiation or other instantiation where the name of the type associated with the entity is not available in namespace scope and/or the name is not available to user code.

Embodiments support generating and outputting host code for compilation by a local compiler which may vary in a variety of ways. A GPGPU compiler may have its own device compiler (e.g., based on a Low Level Virtual Machine (LLVM)) and use the local host compiler for compilation of the host code. The host compiler may thus not be controlled by the company or entity producing the GPGPU compiler (e.g., g++, clang, cl.exe). Thus, the host code produced by embodiments is capable of being compiled by any of a variety of host compilers that are not customized for use with the GPGPU compiler.

For code without lambda expressions, specializations (e.g., int, double, and other types) of device code entry function templates can be sent to the host compiler without modification. For example, for a template instantiated with an int type, the code sent to the host compiler will have a template specialization of int and associated parameters. The host code is then compiled and at runtime sets up commands sent to the GPU at runtime, including setup arguments, launching the kernel and waiting for the kernel, etc.

Lambda expressions create a problem with template specialization where the name of the type is not known and the host compiler may not be customized. Lambda expressions further create an issue defined where the lambda is an instance of the functor type and when the lambda is defined within a function, the type itself is local to the function. For example, for a lambda declaration in a main function, the type of the lambda expression (even if it was explicit) would not be available for template specializations outside of the main function due to the C++ rules making the type local to the main function, along with the local variables. The type of closure, e.g., functor, is also local, limiting reference to the closure type outside of the main function.

Thus, the lambda expressions create two problems: 1) the closure type does not have an explicit name and 2) if there was a name for the closure type, the closure type is itself local to the function scope. Embodiments are configured to solve this problem, by identifying a lambda expression, replacing the lambda expression with a placeholder type, which is actually outside of the scope (e.g., function scope) where the lambda expression is defined. The placeholder type being outside of the scope where the lambda expression is defined allows the placeholder type to be referenced anywhere and thereby be used for template specialization.

Figure 2:
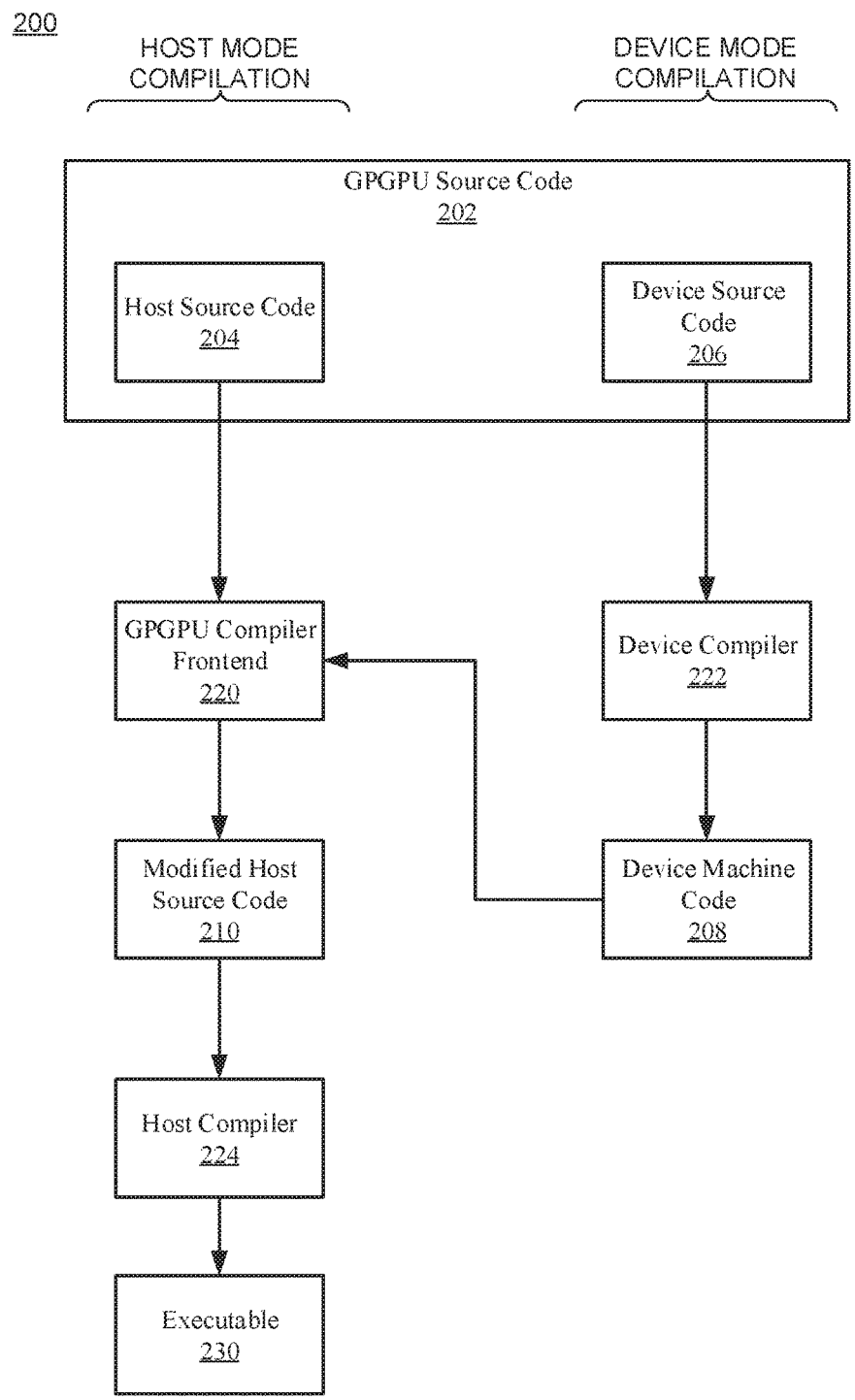
FIG. 2 shows an exemplary computer controller compilation process of host code and device code, in accordance with various embodiments.
Figure 3:
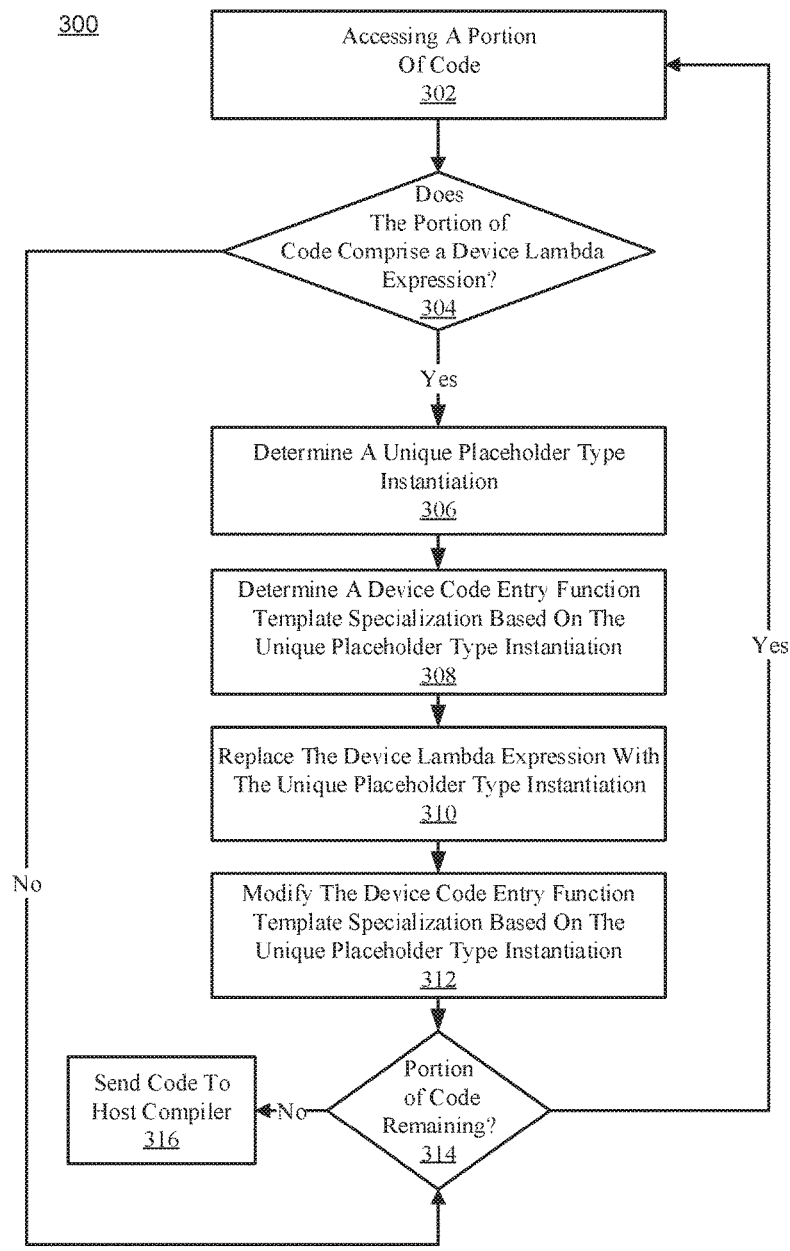
FIG. 3 shows a flowchart of an exemplary computer controlled process for processing a source code file in accordance with various embodiments.
Figure 4:
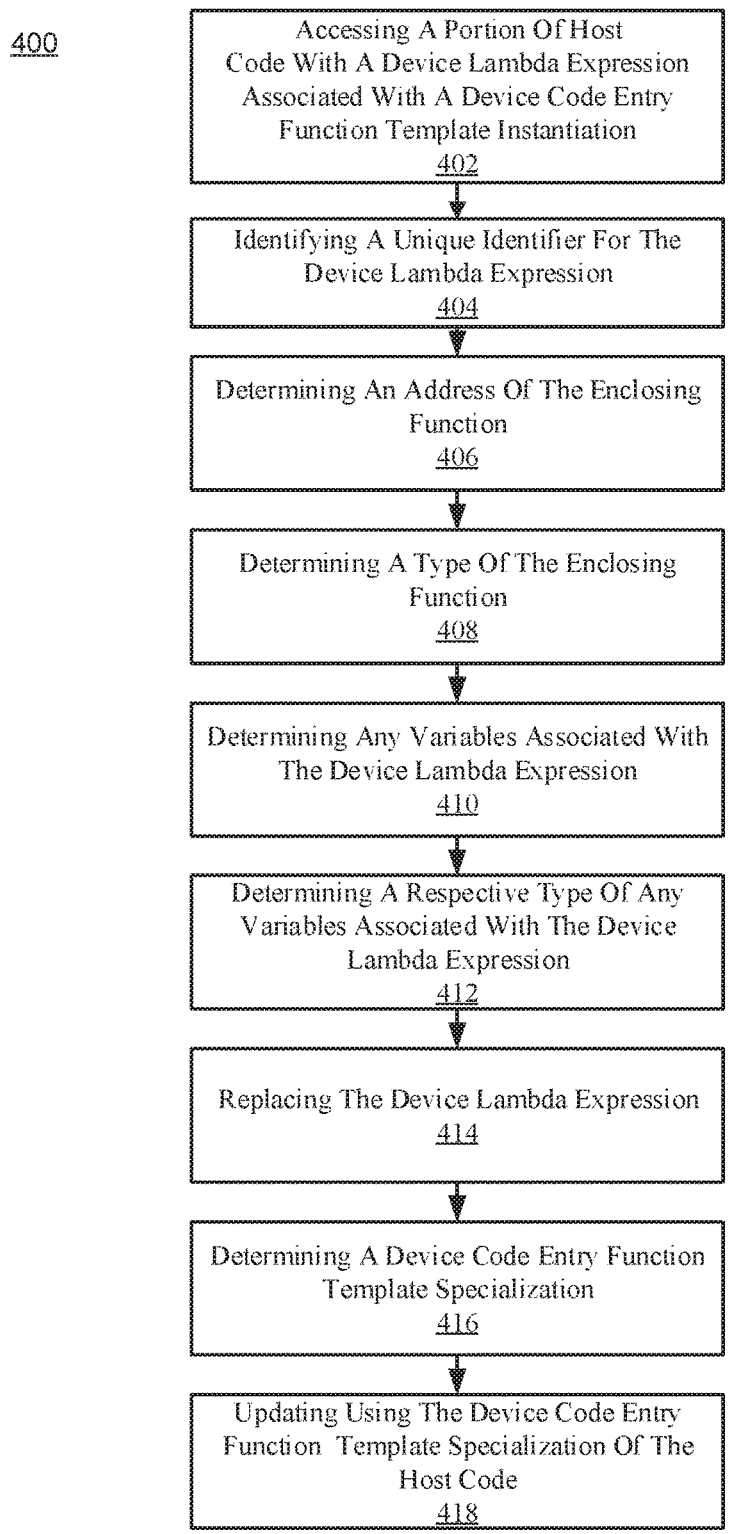
FIG. 4 shows a flowchart of an exemplary computer controlled process for determining and modifying a source code file with a unique placeholder type instantiation in accordance with various embodiments.

With reference to FIGS. 2-4, flowcharts 200-400 illustrate example functions used by various embodiments of the present invention. Although specific function blocks ("blocks") are disclosed in flowcharts 200-400, such steps are examples. That is, embodiments are well suited to performing various other blocks or variations of the blocks recited in flowcharts 200-400. It is appreciated that the blocks in flowcharts 200-400 may be performed in an order different than presented, and that not all of the blocks in flowcharts 200-400 may be performed.

Referring to FIG. 2, FIG. 2 shows an exemplary computer controller compilation process 200 for host code and device code, in accordance with various embodiments. FIG. 2 depicts the various processing stages and data flow passing information between host compiler and device compiler for compilation of a GPGPU program. The exemplary process 200 includes two portions: 1) device mode compilation and 2) host mode compilation.

The device mode compilation involves accessing the GPGPU source code (e.g., a .cu file) and processing it to produce device (e.g., GPU) machine code. For example, the device machine code can be parallel-thread-execution (PTX) machine code or part of a cubin (CUDA binary) file. During the host mode compilation, the generated device machine code is inserted into the host source code which is then sent to the host compiler. The host compiler then compiles the host source code portion and outputs an executable.

The GPGPU source code 202 includes host source code 204 and device source code 206. The device source code 206 is accessed by the device compiler 222 which compiles the device source code 206 into device machine code 208. During the compilation of the device source code 206, device code entry function templates can be instantiated with template arguments involving the closure type associated with device lambda expressions. It is noted that for a device lambda expression used in an instantiation of a device code entry function template, the device compiler is aware of the closure type and can generate template instantiations in accordance with C++ rules.

Host source code 204 is accessed by the GPGPU compiler frontend 220 which processes the host source code 204 to produce modified source code 210. In some embodiments, the GPGPU compiler frontend 220 removes the device functions and keeps the host functions from the GPGPU source code 202. The device machine code 208 is inserted or embedded by the GPGPU compiler frontend 220 into appropriate sections of the modified source code 210 (e.g., in place of the device functions). For device lambdas expression defined in host code that are used for device code entry function template instantiations (e.g., CUDA C++ _global_ template function instantiation for execution on the device), the lambda expressions are replaced with an instance of a placeholder type instantiations. For example, a device lambda expression is replaced with an instance of a unique placeholder type instantiation, as described herein. In some embodiments, the GPGPU compiler frontend 220 determines if any variables are captured for each device lambda expression and creates an instance of a placeholder type template instantiation with respective fields for each of the captured variables as template arguments. The template arguments for a placeholder instantiation associated with a device lambda expression can include the type of a function enclosing the device lambda expression, the address of the enclosing function, a unique identifier (e.g., a uniquely assigned integer) associated with a device lambda expression, and any variables that are captured by the device lambda expression.

Based on the placeholder type instantiation replacements of any device lambda expressions, the modified source code 210 sent to or accessed by the host compiler 224. During the processing of the modified host source code 210, the host compiler 224 will not see device lambda expressions but rather a constructor call to create an instance of a placeholder type or unique placeholder type instantiations associated with the replaced lambda expression. The modified source code 210 is accessed by the host compiler 224 and compiled to produce an executable 230.

FIG. 3 shows a flowchart of an exemplary computer controlled process for processing a source code file in accordance with various embodiments. FIG. 3 depicts a process 300 of modifying host code (e.g., by GPGPU compiler frontend 220) to allow compilation of host code including device lambda expressions defined in the host code that are associated with a respective device code entry function template instantiation.

At block 302, a portion of code is accessed. The portion of code accessed can be host source code (e.g., host source code 204).

At block 304, whether the portion of the code comprises a device lambda expression is determined. In some embodiments, whether a portion of host source code comprises a device lambda expression associated with a device code entry function template instantiation is determined. If the portion of code includes a device lambda expression, block 306 is performed. If the portion of code does not include a device lambda expression, block 314 is performed.

At block 306, a unique placeholder type instantiation is determined. As described herein, the unique placeholder type instantiation is determined based on the device lambda expression. For example, the unique placeholder type instantiation can be determined based on a type of function enclosing the device lambda expression, an address of the function enclosing the device lambda expression, one or more types associated with one or more variables of the device lambda expression, and the one or more variables of the device lambda expression.

At block 308, a device code entry function template specialization is determined based on the unique placeholder type instantiation. As described herein, the device code entry function template specialization can include uniquely identifying information associated with the unique placeholder type instantiation including, but not limited to, a type of function enclosing the device lambda expression, an address of the function enclosing the device lambda expression, one or more types associated with one or more variables of the device lambda expression, and the one or more variables of the device lambda expression.

At block 310, the lambda expression is replaced with an instance of the unique placeholder type instantiation. As described herein, the device lambda expression is replaced with an instance of the unique placeholder type instantiation to provide a type to be used for compilation of host source code by a host compiler.

At block 312, a device code entry function template specialization is modified based on the unique placeholder type instantiation. The device code entry function template specialization is modified to allow invoking, through the placeholder type instantiation, of the previous device lambda expression functionality from host code through the device code entry function template specialization based on the placeholder type instantiation.

At block 314, whether a portion of code remains to be processed is determined. If there is a portion of code remaining to be processed, block 302 is performed. If there is no portion of code remaining to be processed, block 316 is performed.

At block 316, the code is sent to the host compiler. As described herein, the code has been modified to allow compilation of the code, including device lambda expressions in host code associated with a device code entry function template instantiation, without change to the host compiler.

FIG. 4 shows a flowchart of an exemplary computer controlled process for determining and modifying a source code file with unique placeholder types in accordance with various embodiments. FIG. 4 depicts the processing of determining unique placeholder type instantiations for each of one or more device lambda expressions and replacing the device lambda expressions. It is appreciated that while the discussion is with reference to device lambda expressions defined within a host function, embodiments may support lambda expression replacement with the unique placeholder type instantiations for lambda expressions outside of a function.

The placeholder type is based on a template and because multiple lambda expressions may exist within a source code file (e.g., host source code file), each lambda expression is replaced with a unique placeholder type. The template (e.g., a generic template) is instantiated with different arguments based on the lambda expression to produce a unique type associated with the lambda expression, as described herein.

During the compilation process, the device lambda expression will be removed from the code to be sent to the host compiler and replaced with device machine code (e.g., GPU assembly or GPU functions) and a placeholder type instantiation. The host compiler will thus see a constructor call to a placeholder type function where a device lambda expression was previously located.

The host code is compiled and based on the compiled host code directing the device to execute portions of device machine code that are associated with the device lambda expression. For example, when the host code executes, at runtime, the correct _global_ specialization based on the placeholder type is invoked and this specialization will in turn trigger execution on the GPU, eventually leading to execution of the device lambda expression on the GPU.

The variables of the device lambda expression are captured and passed to the device code entry function (e.g., using byte copy). The device code entry function then executes the functionality of the device lambda expression that was replaced with the instantiation of the placeholder type. For example, a placeholder type object has a constructor function that saves the values of the variables captured in the original lambda expression. The placeholder type instance is then passed to the device code entry function template instantiation. The device code entry function template instantiation will execute on the device (e.g., GPU) and perform the operations associated with the device lambda expression.

Referring to FIG. 4, the process 400 involves using a placeholder type template to create a unique placeholder template instantiation for each device lambda expression. A host function may include many device lambda expressions, with each device lambda expression having a different capture list (e.g., arguments or parameters). For example, referring to Table III, there could be a lambda expression that captures 'x', while another lambda expression captures 'x' and 'd,' and another lambda expression captures no variables.

At block 402, the host code with a device lambda expression associated with a device code entry function template instantiation is accessed. In one embodiment, the GPGPU (e.g., CUDA) compiler frontend (e.g., GPGPU compiler frontend 220) accesses a host source code portion of a GPGPU source code file.

At block 404, a unique identifier is determined for the device lambda expression. In one embodiment, a unique integer is determined for each device lambda expression in each host function. The unique identifier can be based on the position of the device lambda expression in the source code. For example, a counter may be used to assign a unique identifier to each device lambda expression as the host source code is processed and incremented after each determined and assigned unique identifier.

At block 406, the enclosing function address is determined. The address of the function enclosing the device lambda expression is determined. Referring to Table III, the main function is the enclosing function for the device lambda expression and the address of the main function (e.g., &main) is determined.

At block 408, the type of the enclosing function is determined. The type (e.g., return type) for the function enclosing device lambda expression is determined. Referring to Table III, the main function is determined to have an int (*)(void) type. The determination of the type and the address of the enclosing function allows differentiation among enclosing functions that are overloaded (e.g., multiple functions with different types and/or arguments are defined with the same name).

At block 410, any variables associated with the device lambda expression are determined. For each device lambda expression, the associated variables are determined and will be used as part of the placeholder. For example, referring to Table III, the 'x' and 'd' variable are the associated variables of the device lambda expression.

At block 412, respective types for any of the variables associated with the device lambda expression are determined. In some embodiments, the function decltype(variable) is used. For example, referring to Table III, the result of decltype(x) would be int and the result of decltype(d) would be double.

At block 414, the device lambda expression is replaced. Each device lambda expression can be replaced by a placeholder type instantiation. The placeholder type instantiation can be configured to invoke placeholder type constructor code.

The code from Table III passed to the host compiler after processing, in accordance with process 400 thus far, can have a body of "main" of:

TABLE IV

Exemplary code portion passed to the host compiler

```
int main(void)
{
int x=10;
double d =20;
auto lam1 = _placeholder_t<int (*) (void), (&main), 1, <decltype(x)>,
<decltype(d)> (x,d);
foo<<<1,1>>>(lam1);
}
```

The '_placeholder_t' is the placeholder namespace scope type template. The instantiating arguments are the type of the enclosing function (e.g., int (*) (void)), the address of the enclosing function (e.g., &main), followed by a unique integer constant associated with the lambda expression (e.g., 1), followed by the types of the captures variables, and the captured variables (e.g., x, d). The values of the captured variables (e.g., x, d) are passed by value to the constructor of the placeholder type and the constructor saves the values as member objects.

At block 416, a device code entry function template specialization is determined. The device code entry function template specialization is determined based on the arguments and information used for the placeholder template for the device lambda expression.

At block 418, the determined device code entry function template specialization is used to update host code. For example, a device code entry function template instantiation is replaced with a device code entry function template specialization based on the placeholder type instantiation. The modified host source code can then be sent to the (local) host compiler.

The code from Table III passed to the host compiler after processing, in accordance with process 400, can have a template specialization of:

TABLE V

Exemplary device code entry function template
specialization passed to the host compiler

```
template< >
void _placeholder_device_stub_foo<_placeholder_t<int(*)( ),
(&main), 1, int, double>>   (_placeholder_t<int(*)( ), (&main), 1,
int, double> & _cuda_0)
{
//code to do kernel launch
}
```

It is noted that in Table V that, instead of attempting to refer to the inaccessible and unnamed closure type associated with the device lambda expression, the template specialization argument instead refers to an instantiation of the placeholder type template (e.g., _placeholder_t).

In this manner, embodiments have the ability to support device code entry function template instantiations where the template arguments used for instantiation refer to device lambda expressions defined in host code. The name of the closure type of a lambda expression, which is not known is replaced with a named placeholder type, where the placeholder type is an instantiation of a type template. The named type of the placeholder instantiation is then used in device code entry function template specializations.

Embodiments allow this support without necessitating any changes to the host compiler. The definition of the device lambda expression is replaced by an instance of the namespace scope "placeholder type" template. The placeholder type instantiations are unique per lambda expression (e.g., based on the lambda expression's enclosing function address and an associated unique integer constant to distinguish the lambda expression from other lambda expressions defined within the same function). The captured variables' types are added to the placeholder type's template instantiation arguments thereby allowing support for capturing variables from the scopes (e.g., function scope) enclosing the original lambda expression. The variables are captured by explicitly passing their values to the constructor of the placeholder type's template instantiation.

Figure 5:
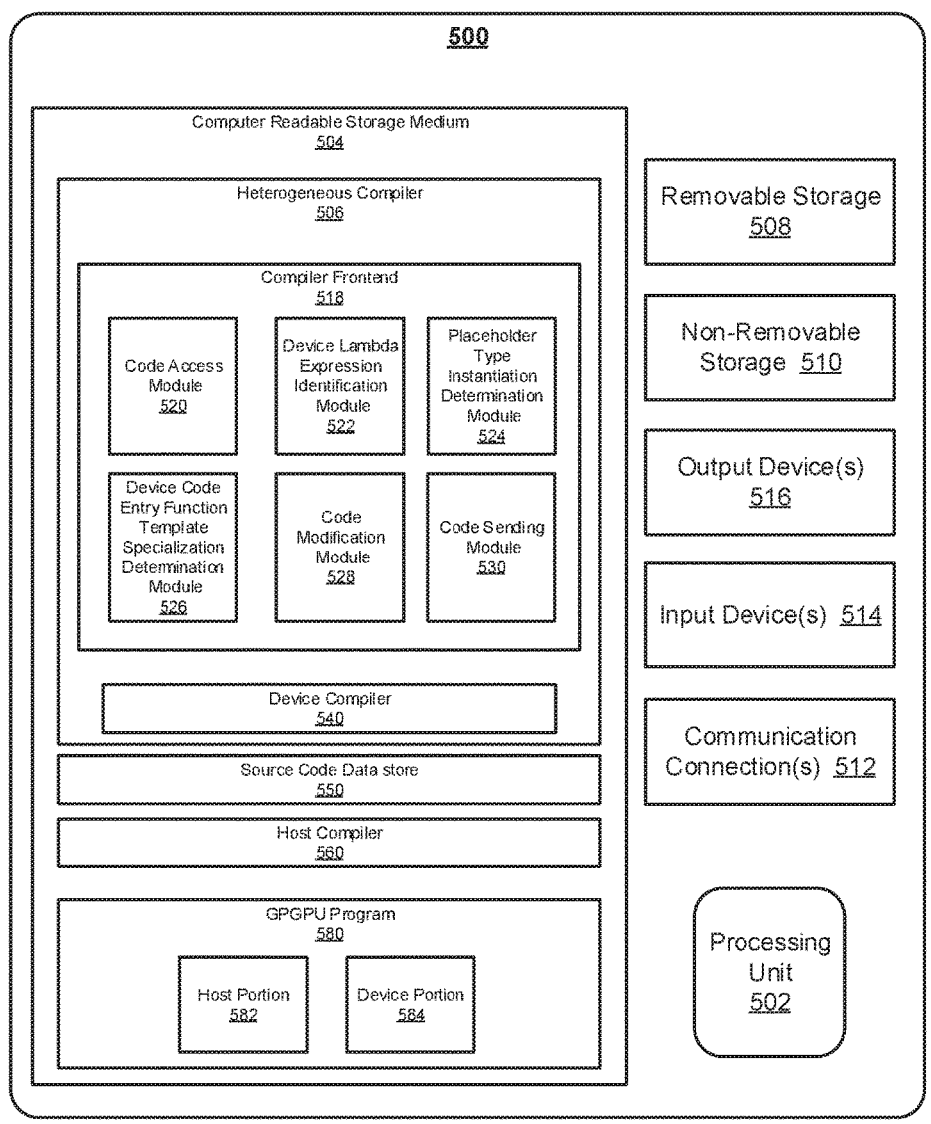
FIG. 5 shows a block diagram of exemplary computer system and corresponding modules, in accordance with various embodiments.

FIG. 5 illustrates exemplary components used by various embodiments of the present invention. Although specific components are disclosed in computing system environment 500, it should be appreciated that such components are examples. That is, embodiments of the present invention are well suited to having various other components or variations of the components recited in computing system environment 500. It is appreciated that the components in computing system environment 500 may operate with other components than those presented, and that not all of the components of system 500 may be required to achieve the goals of computing system environment 500.

FIG. 5 shows a block diagram of exemplary computer system and corresponding modules, in accordance with one embodiment of the present invention. With reference to FIG. 5, an exemplary system module for implementing embodiments includes a general purpose computing system environment, such as computing system environment 500. Computing system environment 500 may include, but is not limited to, servers, desktop computers, laptops, tablet PCs, mobile devices, and smartphones. In its most basic configuration, computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed perform compilation of code for a GPGPU program (e.g., processes 200-500).

Additionally, computing system environment 500 may also have additional features/functionality. For example, computing system environment 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Computer readable medium 504, removable storage 508 and nonremovable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 512 may allow computing system environment 500 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 512 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 500 may also have input device(s) 514 such as a keyboard, mouse, pen, voice input device, touch input device, remote control, etc. Output device(s) 516 such as a display, speakers, etc. may also be included. All these devices are well known in the art and are not discussed at length.

In one embodiment, the computer readable storage medium 504 includes a heterogeneous compiler 506, a source code data store 550, a host compiler 560, and a GPGPU program 580. The source code data store 550 (e.g., file, repository, database, etc.) may comprise source code, including host source code and device source code, for compilation into a GPGPU program having a host (e.g., CPU) portion 582 and device (e.g., GPU) portion 584. In some embodiments, the host source code is operable to be compiled for execution on a CPU and device source code is operable to be compiled to execute on a GPU. The host compiler 560 is configured for compiling host source code, as described herein. The GPGPU program 580 is output by host compiler 560 after compiling host source code from source code data store 550, as described herein. It is noted that the modules and components of computer readable storage medium 504 may also be implemented in hardware.

The heterogeneous compiler 506 comprises a compiler frontend 518 and a device compiler 540. The heterogeneous compiler 506 is configured for compiling device source code, using device compiler 540, and modifying host source code, using the compiler frontend 518. The compiler frontend 518 is configured to modify host source code, as described herein, to allow compilation of host source code comprising a lambda expression associated with a device code entry function template instantiation. The device compiler 540 (e.g., device compiler 222) is configured to compile device source code into device machine code, as described herein.

The compiler frontend 518 includes a code access module 520, a device lambda expression identification module 522, a placeholder type instantiation determination module 524, a device code entry function template specialization determination module 526, a code modification module 528, and a code sending module 530.

The code access module 520 is operable to access source code from a data store, e.g., the source code data store 550. The source code comprises host source code and device source code. The device lambda expression identification module 522 is configured to identify a device lambda expression in a portion of the host source code that is associated with a device code entry function template instantiation. The placeholder type instantiation determination module 524 is configured to determine a placeholder type instantiation based on the device lambda expression, as described herein. In some embodiments, the placeholder type instantiation comprises a type associated with a function enclosing the lambda expression. In some embodiments, the placeholder type instantiation comprises an address of the function enclosing the lambda expression. In some embodiments, the placeholder type instantiation comprises a unique identifier associated with the lambda expression. In some embodiments, the placeholder type instantiation comprises one or more variables associated with the lambda expression. In some embodiments, the placeholder type instantiation captures the one or more variables associated with the lambda expression by explicitly passing the values of the one or more variables to a constructor of the placeholder type instantiation.

The code modification module 528 is configured to modify the host source code to replace the device lambda expression with the placeholder type instantiation. The device code entry function template specialization determination module 526 is configured to determine a device code entry function template specialization based on the device lambda expression. In some embodiments, the code modification module 528 is further configured to modify the host code based on the device code entry function template specialization determined by the device code entry function template specialization determination module 526. The code sending module 530 is configured to send the host source code as modified by the code modification module to a host compiler.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of processing source code, the method comprising:
    accessing, by a processor of a computing device, a portion of host source code, the portion of host source code being stored in a data store;
    determining, by the processor, whether the portion of the host source code comprises a device lambda expression;
    in response to the portion of host code comprising the device lambda expression, determining, by the processor, a unique placeholder type instantiation based on the device lambda expression, wherein the unique placeholder type instantiation comprises one or more variables associated with the device lambda expression;
    modifying, by the processor, the device lambda expression based on the unique placeholder type instantiation to produce modified host source code; and
    sending the modified host source code to a host compiler executed by the processor.

2. The method as described in claim 1, wherein the device lambda expression is associated with a device code entry function template instantiation.

3. The method as described in claim 1, wherein the unique placeholder type instantiation comprises a type associated with a function enclosing the device lambda expression.

4. The method as described in claim 3, wherein the unique placeholder type instantiation comprises an address of the function enclosing the device lambda expression.

5. The method as described in claim 1, wherein the unique placeholder type instantiation comprises a unique identifier associated with the device lambda expression.

6. The method as described in claim 1, wherein the unique placeholder type instantiation captures the one or more variables associated with the device lambda expression by explicitly passing the values of the one or more variables to a constructor of the placeholder type instantiation.

7. The method as described in claim 1 further comprising:
determining a device code entry function template specialization based on the unique placeholder type instantiation associated with the device lambda expression, wherein the host source code comprises a device code entry function template; and
modifying the device code entry function template based on the device code entry function template specialization.

8. A system for compiling code, the system comprising:
a code access module instantiated by a processor of a computing device and operable to access source code from a data store of the computing device, wherein the source code comprises host source code and device source code;
a device lambda expression identification module instantiated by a processor of the computing device and configured to identify a device lambda expression in a portion of the host source code;
a placeholder type determination module instantiated by a processor of the computing device and configured to determine a placeholder type instantiation based on the device lambda expression, wherein the placeholder type instantiation comprises one or more variables associated with the device lambda expression; and
a code modification module instantiated by a processor of the computing device and configured to modify the host source code to replace the device lambda expression with the placeholder type instantiation.

9. The system as described in claim 8 further comprising:
a template specialization determination module configured to determine a device code entry function template specialization based on the device lambda expression.

10. The system as described in claim 9, wherein the code modification module is further configured to modify the host code based on the device code entry function template specialization determined by the template specialization determination module.

11. The system as described in claim 8 further comprising:
a code sending module configured to send the host source code as modified by the code modification module to a host compiler.

12. The system as described in claim 8, wherein the placeholder type instantiation comprises a type associated with a function enclosing the device lambda expression.

13. The system as described in claim 12, wherein the placeholder type instantiation comprises an address of the function enclosing the device lambda expression.

14. The system as described in claim 8, wherein the placeholder type instantiation comprises a unique identifier associated with the device lambda expression.

15. The system as described in claim 8, wherein the placeholder type instantiation captures the one or more variables associated with the device lambda expression by explicitly passing the values of the one or more variables to a constructor of the placeholder type instantiation.

16. A method for modifying code for compilation comprising:
accessing, by a processor of a computing device, a portion of host source code in a data store of the computing device;
determining, by the processor, whether the portion of the host source code comprises a device lambda expression associated with a device code entry function template instantiation;
determining, by the processor, a unique placeholder type instantiation based on device lambda expression, wherein the unique placeholder type instantiation comprises one or more variables associated with the device lambda expression;
determining, by the processor, a device code entry function template specialization based on the unique placeholder type instantiation, wherein the host source code comprises a device code entry function template;
generating, by the processor, modified host source code by replacing the device lambda expression with an instance of the unique placeholder type instantiation;
generating, by the processor, a device code entry function specialization based on the unique placeholder type instantiation; and
sending the modified host source code to a host compiler executed by the processor.

17. The method as described in claim 16, wherein the unique placeholder type instantiation comprises a type associated with a function enclosing the device lambda expression.

18. The method as described in claim 17, wherein the unique placeholder instantiation comprises an address of the function enclosing the device lambda expression and a unique integer identified associated with the device lambda expression.

* * * * *